358-190. OR 2,948,776 SR
SEARCH ROOM
Aug. 9, 1960 R. A. KRAFT 2,948,776
TELEVISION RECEIVER
Filed June 16, 1958
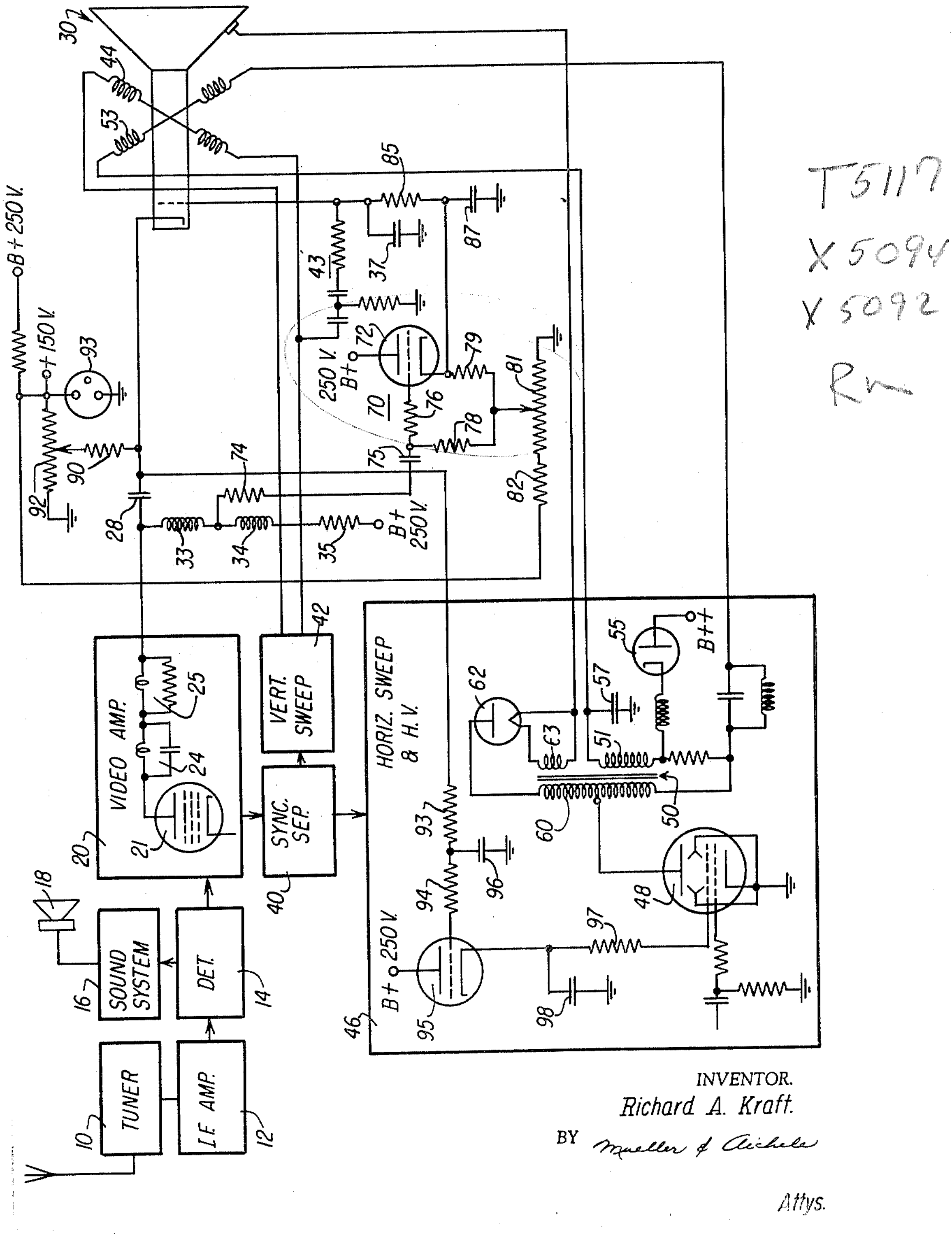
T5117
X5094
X5092
Rm
INVENTOR.
Richard A. Kraft
BY Mueller & Aichele
Attys.

United States Patent Office 2,948,776
Patented Aug. 9, 1960

2,948,776

TELEVISION RECEIVER

Richard A. Kraft, Elmhurst, Ill., assignor to Motorola, Inc., Chicago, Ill., a corporation of Illinois Filed June 16, 1958, Ser. No. 742,267

3 Claims. (Cl. 178—7.5)

This invention relates to television receivers and more particularly to a voltage regulator circuit for use in the horizontal deflection and high voltage system of a television receiver.

The high voltage for the screen of a cathode ray picture tube is generally of the order of 15–20 kilovolts and is usually produced by utilizing energy from the horizontal or line deflection system in the receiver. In order to form a picture of maximum brightness level it is desirable that the high voltage be as high as possible. However, in a receiver designed for producing very bright pictures, if the brightness control is turned down to reduce the beam current and picture brightness, the high voltage may rise considerably since the voltage drop in the high voltage source would be reduced and this can cause damage to circuit components if at such time the voltage ratings of these components are exceeded.

A change in high voltage can also result in deterioration of beam focus when the average beam current varies because of a change in the average video signal or a change in the brightness control setting. Furthermore, a change in the high voltage for the cathode ray tube adversely affects picture size since the high voltage derived in the horizontal deflection system can change the power available for deflection signals.

Therefore, regulation of the high voltage in a television receiver permits construction of a receiver producing brighter images without danger of component damage at lower brightness settings, and regulation can assist in maintaining focus and image size with a change in brightness control setting or average picture content.

An object of this invention is to provide an improved high voltage regulating system for a television receiver wherein the high voltage is regulated in direct relation to the cathode ray beam current so that the high voltage will not vary with a change in brightness control setting, thus avoiding the possibility of circuit component damage and change in picture size or loss of focus.

Another object is to provide a simple and inexpensive regulation system for the line deflection system of a television receiver to regulate the level of the line sweep signals and the high voltage for the screen of the cathode ray picture tube.

A feature of the invention is the provision of a potentiometer network coupled through a regulating resistor to the cathode of the picture tube for biasing this tube, and a connection of this cathode to the grid of a control tube which is series coupled in an energizing circuit for the screen grid of the horizontal output tube which supplies signals for horizontal deflection and high voltage.

Another feature is the provision of a television receiver including a direct current restorer and a brightness control for regulating beam current in the cathode ray picture tube and wherein the drive of a horizontal output tube is directly responsive to changes in the cathode potential of the picture tube when the beam current therein changes.

Further objects, features and the attending advantages of the invention will be apparent upon consideration of the following description when taken in conjunction with the accompanying drawing in which the figure is a schematic diagram of a television receiver utilizing the invention.

In brief, there is provided a cathode ray tube in a television receiver for which horizontal or line deflection signals are furnished by a sweep system utilizing a pentode output tube driving a transformer coupled to a deflection yoke for the cathode ray tube. Energy in the transformer is also used in a suitable rectifier circuit to develop high voltage for the cathode ray tube. A potentiometer is coupled through a regulating resistor to the cathode of the cathode ray tube as part of the regulating circuit. In the grid to cathode circuit of the cathode ray tube there is also a bias control for adjusting the brightness of a picture and there may further be a direct current restorer connected in this circuit. The potential at the cathode of the cathode ray tube which changes with a change in beam current, that is, with a change in brightness control setting or average video signal level, is applied to the control grid of a control triode. This triode is series connected in a screen grid energizing circuit for the horizontal output tube so that the drive of this tube directly follows changes in beam current in the cathode ray tube, thereby regulating the high voltage provided by the horizontal deflection system.

In the figure, the television receiver includes a tuner 10 which selects a received signal and converts it to a signal of intermediate frequency which is applied to the intermediate frequency amplifier 12. The television signal of intermediate frequency is then coupled to the detector 14 which supplies the sound portion of the signal to the sound system 16 where it is demodulated and amplified to drive loudspeaker 18. Detector 14 is also coupled to the video amplifier circuit 20 which includes an amplifier tube 21, the anode of which is connected through networks 24 and 25 and blocking capacitor 28 to the cathode of the cathode ray picture tube 30. B+ is applied to the anode of tube 21 through coils 33 and 34 and resistor 35. The control grid of the tube 30 is grounded at video signal frequencies by means of capacitor 37. Accordingly, the signal from amplifier circuit 20 drives the cathode with respect to the grid of the picture tube 30.

The video amplifier 20 is also connected to the synchronizing signal separator 40 which provides synchronizing signals from the received television signal to control the vertical sweep system 42 which is connected to the vertical or field winding 44 of the deflection yoke. Network 43 applies a blanking signal from system 42 to the control grid of tube 30. The sync separator circuit 40 is also connected to the horizontal sweep and high voltage system 46 which includes a suitable oscillator circuit (not shown) to drive the horizontal output tube 48.

Output tube 48 may be of the beam power or pentode type and the anode thereof is connected to a horizontal output transformer 50. Winding portion 51 of transformer 50 is coupled across the line or horizontal deflection winding 53 of the yoke disposed on the neck of tube 30. A damper diode 55 is also connected between winding 51 and B++ and this cooperates with bootstrap capacitor 57 to provide a so-called boost voltage thereacross which may be used as an energizing potential for other portions of the receiver as is understood in the art. The horizontal output system including output tube 48 and transformer 50 function in a known manner to form saw-tooth signals of line frequency for the yoke winding 53 for horizontal deflection of the cathode ray beam in tube 30.

Signals controlling output tube 48 are such as to cause this tube to be cut off at the start of retrace of the beam in picture tube 30 at which time the transformer and yoke circuit is allowed to ring at its natural resonant frequency. As this ringing signal continues during retrace of the beam, damper diode 55 is rendered conductive at the start of the beam trace and this tube continues to conduct so that the deflection signal is applied to the yoke winding 53 until output tube 48 is again rendered conductive. At this time the damper diode is cut off and conduction of tube 48 continues to supply the horizontal deflection signal until it is again cut off and the process repeats.

Signals of line deflection frequency are introduced into winding portion 60 of the horizontal output transformer 50 and these signals are applied to the anode of high voltage rectifier diode 62. The filament of this diode is energized by a winding 63 of the transformer 50. This filament is also connected to the high voltage anode or screen of the cathode ray tube 30 to provide a high voltage potential therefor of the order of 15–20,000 volts.

A direct current restorer circuit 70 is also connected between the output of video amplifier circuit 20 and the control grid of the cathode ray tube 30. The grid of triode 72 is connected from the junction of chokes 33, 34 and through resistor 74, capacitor 75 and resistor 76 to the control grid of this tube. The junction of capacitor 75 and resistor 76 is connected through resistors 78 and 79 to the cathode of triode 72. This input network for the triode provides detection of the composite video signal so that the grid potential is clamped essentially at the black level of the video signal.

The junction of resistor 78 and resistor 79 is connected to the arm of a potentiometer 81, one side of which is connected to ground and the other side of which is connected through a resistor 82 to a regulated potential of 150 volts. The anode of tube 72 is connected to B+ (250 volts). The cathode of this tube is coupled through resistor 85 to the control grid of cathode ray tube 30 and this cathode is also bypassed for signal frequencies by capacitor 87. Accordingly, the control grid of the cathode ray tube is maintained at a D.C. level which is fixed by the black level of the video signal so that it does not vary with respect to the cut off point of tube 30. Adjustment of the potentiometer 81 will provide a variable direct current potential on resistor 79 to control the quiescent conduction of triode 72 and this direct current potential is applied to the control grid of tube 30 as a bias. Accordingly, potentiometer 81 is a brightness control which regulates the beam current in tube 30.

The cathode of a picture tube 30 is connected through a regulating resistor 90 to the arm of a potentiometer 92. The fixed ends of potentiometer 92 are connected between ground and plus 150 volts, which voltage is regulated against line voltage changes by regulator tube 93. Potentiometer 92 is also effectively a brightness control for setting the beam current in tube 30. However, resistor 90 and the setting of potentiometer 92 are chosen to give the necessary voltage change at the cathode of tube 30 for a given current change in this tube so that control tube 95 gives the desired regulation. Potentiometer 81 is then the brightness control generally used by the consumer.

The cathode of tube 30 is connected through resistor 93 and resistor 94 to the control grid of the control triode 95. Capacitor 96 is connected between the junction of resistors 93, 94 and ground. This resistor capacitor network provides filtering of the video signals so that the potential on the control grid of triode 95 varies according to the average cathode potential in tube 30 which depends upon the average beam current in this tube.

The cathode of triode 95 is connected to the screen grid of horizontal output tube 48 through resistor 97 and the cathode of triode 95 is bypassed to ground through capacitor 98. The anode of this triode is connected to B+. Therefore, it may be seen that as the average beam current in tube 30 increases, greater current will be drawn through a portion of potentiometer 92 and resistor 90 to raise the cathode potential and increase the potential on the control grid of triode 95. This will cause increased conduction of this triode to raise the screen grid potential in the horizontal output tube 48. Such an increase of the screen grid potential will cause greater conduction of this tube and increased drive of the horizontal deflection winding 53 and the high voltage rectifier circuit, including diode 62. Since such an increased beam current in tube 30 will draw greater current through the high voltage rectifier circuit, this voltage would ordinarily decrease due to a greater potential drop across the internal impedance of this rectifier circuit. However, in the system described, this drop in high voltage potential is compensated by increasing the output of a horizontal output tube 48 to correspondingly offset the tendency for decrease of the high voltage. Similarly, a decrease in beam current in cathode ray tube 30 will cause a corresponding decrease in the conduction of horizontal output tube 48 at which time there would ordinarily be a tendency for increase of the high voltage supplied to the screen of tube 30. However, this system will automatically reduce the output of the horizontal output circuit thereby tending to offset the change in high voltage. The value of regulating resistor 90 and potentiometer 92 are chosen in keeping with the other components of the system so that the high voltage applied to the screen of tube 30 is maintained substantially constant over various changes in the average beam current in this tube. In a system of practical construction, component values were as follows:

| | |
|---|---|
| Resistor 90 ____ohms__ | 100,000 |
| Potentiometer 92 ____do____ | 50,000 |
| Resistor 93 ____megohms__ | 1 |
| Resistor 94 ____ohms__ | 3,300 |
| Triode 95 ____ | (½) 6CS7 |
| Capacitor 96 ____microfarads__ | .05 |
| Resistor 97 ____ohms__ | 1,000 |
| Capacitor 98 ____microfards__ | .1 |
| Output tube 48 ____ | 6CD6 |

As previously indicated a change in the setting of brightness control 81 will cause a corresponding change in the average beam current in the cathode ray picture tube 30 which would tend to cause a change in the high voltage potential on the screen of the picture tube. Furthermore, a change in average scene brightness will cause a corresponding change in the average D.C. component of the video signal which is applied to the control grid of the picture tube through the direct current restorer circuit 70. However, in either case this change in average beam current does not produce a corresponding change in the high voltage potential due to the action of the described regulator circuit. Maintaining the high voltage constant in this manner, tends to maintain the focus of the beam and also prevents a rise in the high voltage at reduced beam current which could otherwise cause damage to circuit components in the system if voltage ratings of any of the components in the high voltage system were exceeded.

I claim:

1. A cathode ray reproducing system with a high voltage regulating system, including in combination, a cathode ray tube having cathode, grid and anode electrodes for producing and controlling an electron beam, circuit means for applying display signals between said cathode and grid electrodes, a potentiometer for biasing said cathode electrode with respect to a reference point, resistor means connecting said potentiometer to said cathode electrode, a sweep system providing signals at line and field requencies for deflecting the beam in said cathode ray tube, said sweep system having horizontal output circuit means with an output tube driving a transformer and rectifier circuit to provide line deflection signals and a high voltage energizing potential with respect to the reference point for said anode electrode of said cathode ray tube, said output tube having a plurality of electrodes including a screen grid, control circuit means including a control tube having a control grid and further having an anode and cathode series coupled in an energizing circuit for said screen grid of said output tube, and a passive direct current conductive circuit connected between said cathode electrode of said cathode ray tube and said control grid of said control tube so that an increase in beam current in said cathode ray tube causes increased conduction of said control tube and said output tube, whereby the line deflection signals and the high voltage energizing potential are regulated as a direct function of the beam current in said cathode ray tube.

2. A television receiver with a high voltage regulating system, including in combination, a cathode ray tube having cathode, grid and anode electrodes for producing and controlling an electron beam, circuit means for applying video signals between said cathode and grid electrodes, adjustable voltage divider means coupled to said grid electrode as a brightness control for said cathode ray tube, potentiometer means for biasing said cathode electrode with respect to a reference point, regulator resistor means connecting said potentiometer means to said cathode electrode, a sweep system including horizontal output circuit means with an output tube driving a transformer and rectifier circuit to provide line deflection signals and a high voltage energizing potential with respect to the reference point for said anode electrode of said cathode ray tube, said output tube having a plurality of electrodes including a screen grid, control circuit means including a control tube having a control grid and further having an anode and cathode coupled in an energizing circuit for said screen grid of said output tube, and a passive direct current conductive circuit connected between said cathode electrode of said cathode ray tube and said control grid of said control tube, said potentiometer means and said regulator resistor means being chosen in value so that a change in beam current in said cathode ray tube causes a corresponding change in conduction of said output tube to maintain a substantially constant high voltage energizing potential with change in beam current.

3. A television receiver with a high voltage regulating system, including in combination, a cathode ray tube having cathode, grid and anode electrodes for producing and controlling an electron beam, circuit means for applying video signals between said cathode and grid electrodes, said circuit means including means providing direct current components of the ivdeo signals to said grid electrode, potentiometer means for biasing said cathode electrode with respect to a reference point, resistor means connecting said potentiometer means to said cathode electrode, variable brightness control means for biasing said grid electrode with respect to the reference point, a sweep system including horizontal output circuit means with a pentode output tube driving a transformer and rectifier circuit to provide line deflection signals and a high voltage energizing potential with respect to the reference point for said anode electrode of said cathode ray tube, said output tube having electrodes including a screen grid, control circuit means including a triode control tube having a control grid and an anode and a cathode, means coupling said anode to a postiive potential source and said cathode to said screen grid to form an energizing circuit for said screen grid of said output tube, and a passive direct current circuit connected between said cathode electrode of said cathode ray tube and said control grid of said control tube so that a change in beam current in said cathode ray tube causes a corresponding change in conduction of said output tube to regulate the high voltage energizing potential as a direct function of the beam current in said cathode ray tube.

References Cited in the file of this patent

UNITED STATES PATENTS

| | | |
|---|---|---|
| 2,651,739 | Chudleigh | Sept. 8, 1953 |
| 2,740,070 | Ogletree | Mar. 27, 1956 |
| 2,825,758 | Revercomb | Mar. 4, 1958 |